Feb. 13, 1940.  E. R. POWELL  2,190,271
METHOD AND APPARATUS FOR MELTING ROCK AND MAKING PRODUCTS THEREFROM
Filed Jan. 21, 1937  3 Sheets-Sheet 1
Fig. 1.
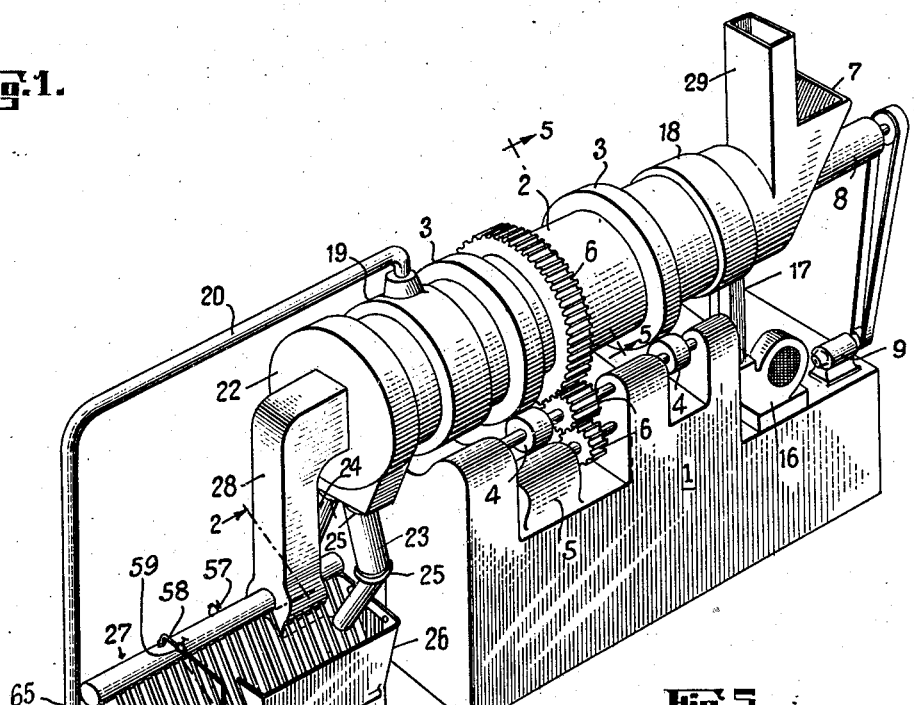
Fig. 4.
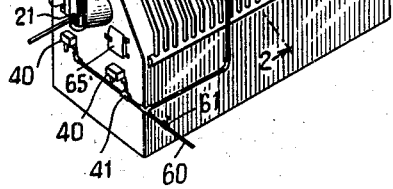
Fig. 5.
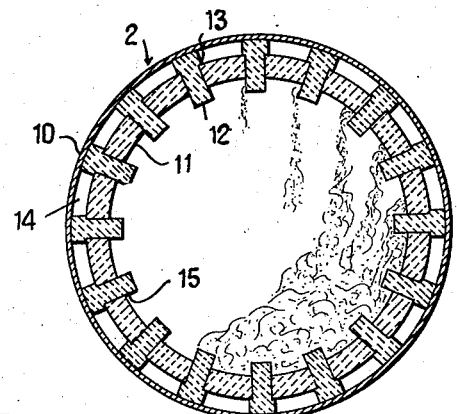
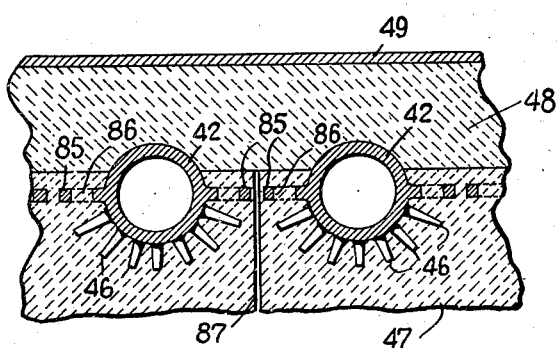
INVENTOR.
Edward R. Powell.
BY Virgil C. Kline
ATTORNEY

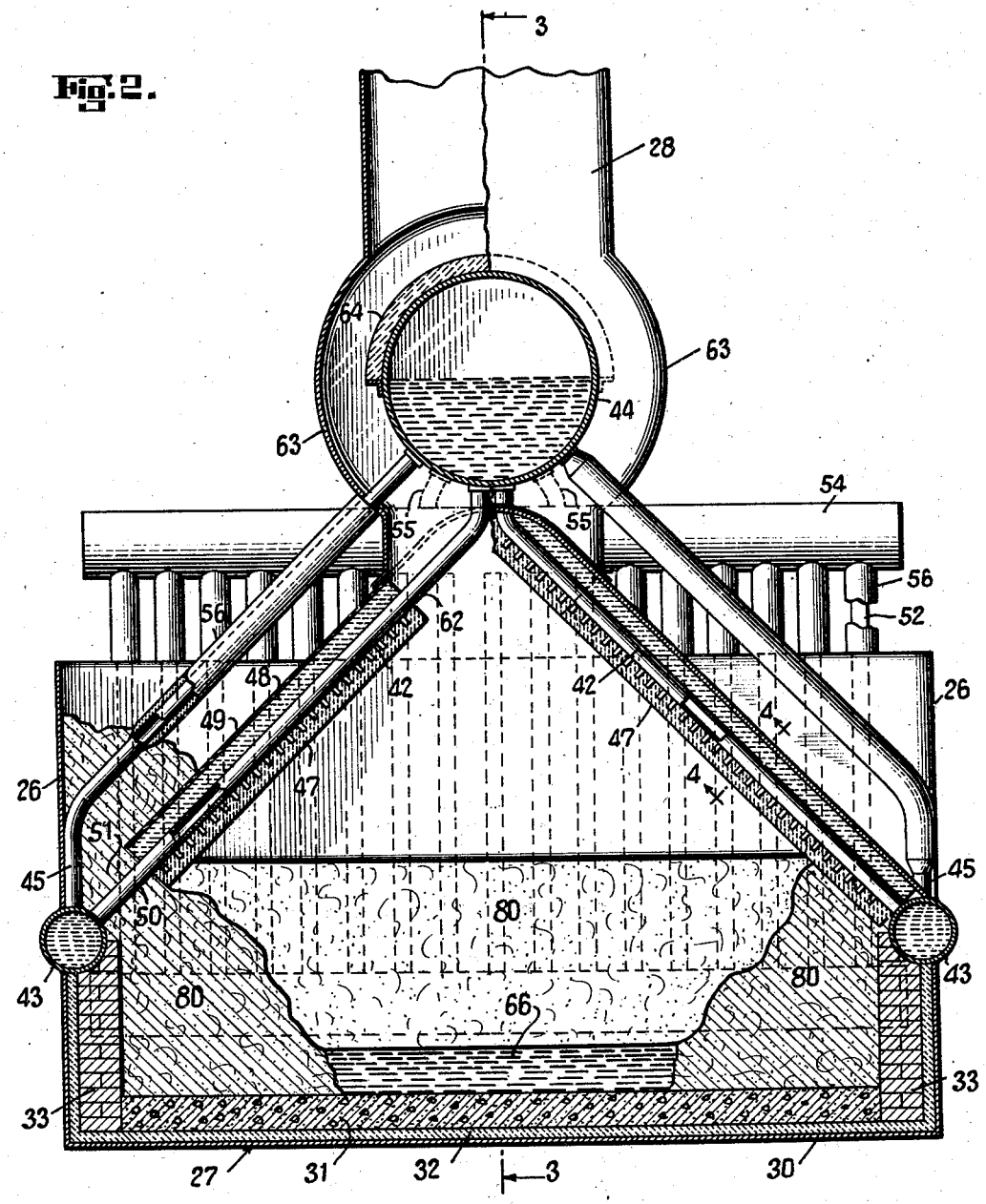

INVENTOR.
Edward R. Powell.
BY Virgil C. Kline
ATTORNEY

Patented Feb. 13, 1940

2,190,271

UNITED STATES PATENT OFFICE 2,190,271

METHOD AND APPARATUS FOR MELTING ROCK AND MAKING PRODUCTS THEREFROM

Edward R. Powell, North Plainfield, N. J., assignor to Johns-Manville Corporation, New York, N. Y., a corporation of New York Application January 21, 1937, Serial No. 121,585

6 Claims. (Cl. 49—53)

This invention relates to a furnace and process for melting rock and to an apparatus and process for producing mineral wool from slag, limestone, rock, shale, sand, or other suitable raw material.

It is an object of this invention to provide an apparatus and process by which raw material can be melted, thoroughly reacted, and clarified under accurate control. More particularly, it is an object of this invention to provide an apparatus and process for melting rock in which ample time is provided for the heat generated by the burning fuel to be properly dissipated by the raw material and thereby secure economy of operation.

It is a further object of this invention to provide an apparatus and process for melting rock, which is later blown into mineral wool or used for other desired purposes, in which fuel can be utilized which is high in calorific value but low in cost and which burns with a highly radiant, luminous flame.

It is a further object of this invention to provide a method and apparatus for making mineral wool in which substantially all of the heat not actually utilized in treating the raw material is converted into steam energy or used to preheat the air for the burner blast.

Other objects and advantages, if not specifically pointed out, will be recognized by those skilled in the art when recourse is had to the following detailed description of what is now considered to be a preferred embodiment of this invention.

In the drawings:

Fig. 1 is a perspective view of one form of apparatus by which my invention may be practised;

Fig. 2 is an elevational cross sectional view taken substantially on the plane represented by line 2—2 in Fig. 1, looking in the direction of the arrows;

Fig. 4 is a fragmentary cross sectional detailed view of the furnace cover on an enlarged scale, taken substantially on the plane indicated by line 4—4 in Fig. 2, looking in the direction of the arrows, and Fig. 5 is a cross sectional view taken substantially on the plane indicated by line 5—5 in Fig. 1, looking in the direction of the arrows.

Figure 3:
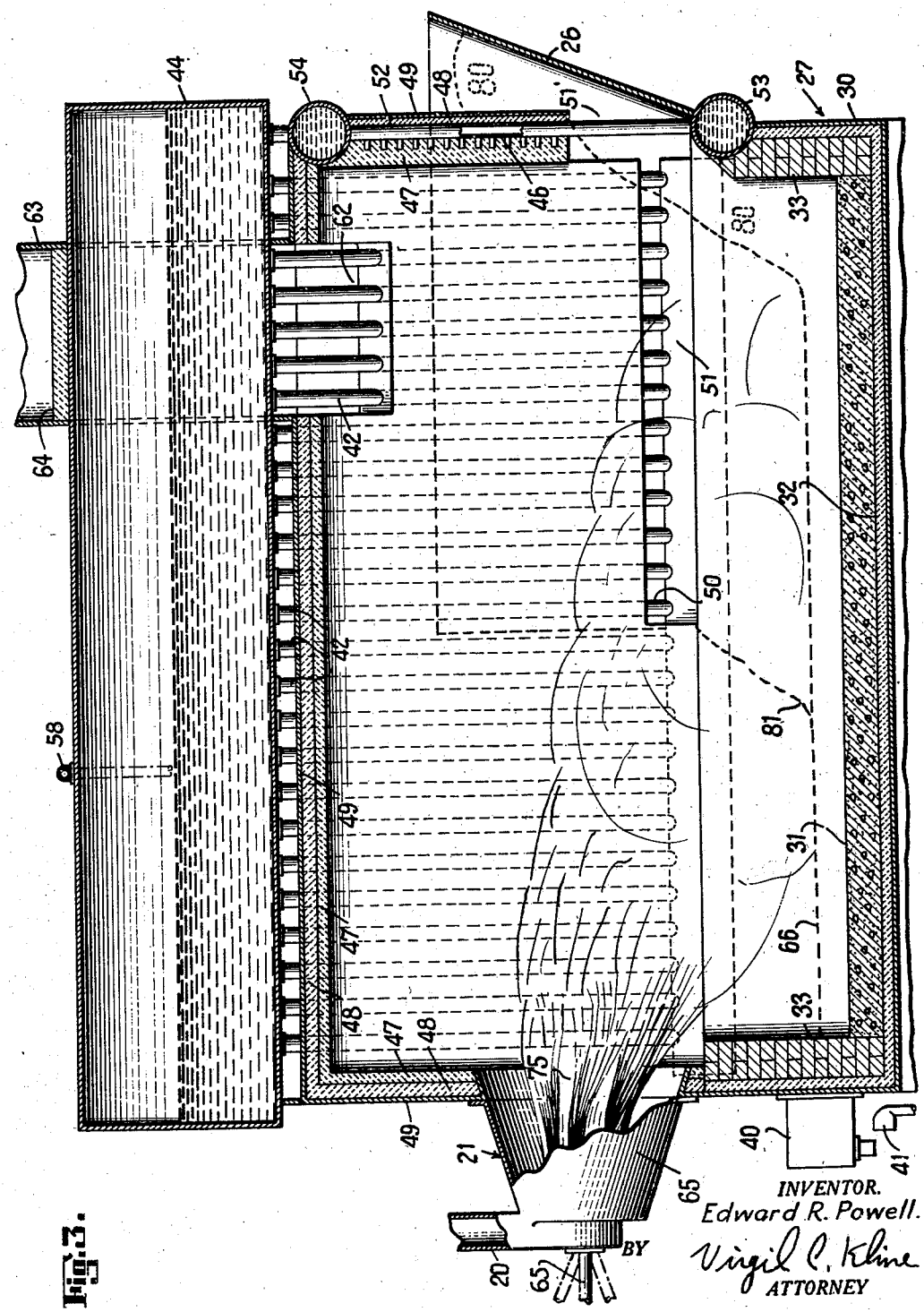
Fig. 3 is an elevational cross sectional view taken substantially on the plane indicated by line 3—3 in Fig. 2, looking in the direction of the arrows.

Referring to Fig. 1, a dryer or calcining device 1 comprises a rotary drum or shell 2 provided with runners 3 which rotate on trunnions 4 supported by the dryer base. The drum 2 is driven by a motor 5 through suitable gearing 6.

Raw material which is usually crushed or otherwise formed in any desired size or in a natural divided state is fed into a hopper 7 by any suitable means. The material in the hopper 7 is fed in measured amounts into the interior of the drum 2 by a feed device 8, which may be of the screw feed or any other conventional type, and which is driven by a motor 9.

The drum 2 of the dryer, as shown in detail in Fig. 5, consists of an exterior metallic shell 10 and an inner wall 11 concentric with the shell 10 and spaced therefrom. The inner wall 11 is built up from firebrick or other suitable refractory elements. The bricks or elements forming the wall 11 are keyed into position by means of members 12 having shoulders 13 for supporting the elements forming wall 11 and spacing said wall from the outer shell.

The elements 12 may be formed of a refractory material and extend continuously along the axis of the drum 2, thereby providing axial ducts 14 between the shell 10 and wall 11, and projections 15 extending inwardly from the wall 11. If desired, the wall 11 may consist of a metallic shell, similar to shell 10, to which metallic members may be attached to form the inwardly extending projections 12 and which may be spaced from the shell 10 by metallic webs or fins. In the latter case, the interior of the metallic inner wall and its projections could be covered with a suitable refractory material.

Air from a blower 16, of any conventional type, is passed through the pipe 17 and into the ducts 14 in the drum 2 by means of a slip gland 18. A similar slip gland 19 at the opposite end of the drum receives the air from the ducts 14 and passes it into a pipe 20 which leads to a burner 21. The slip glands 18 and 19 and the burner 21 may be of any conventional type and do not of themselves form a part of this invention.

The drum 2 is inclined at such an angle and the material is fed into the drum by the measuring feed screw 8 at such a rate that the raw material is caused to pass progressively through the drum from end to end as the drum rotates. At the end of the drum, remote from that into which the raw material is fed, it passes into a header 22 provided with a hopper bottom which feeds into manually movable spouts 23 and 24 which are suitably socketed at points 25 to enable the discharge ends of the spouts to be traversed over considerable areas and thus feed pre-heated material into a bin 26 of a melting furnace indicated generally at 27.

Exhaust gases from the furnace 27 pass upwardly through a stack 28 which passes them through the header 22 into the space within the inner wall 11 of the dryer drum 2. The hot exhaust gases pass completely through the drum 2 counter to the direction of flow of the raw material and pass out through a stack 29 to any suitable flue and finally to the atmosphere.

The hot exhaust gases in passing over the raw material in the dryer heat treat the same in a manner to be described later in detail and, also, transfer heat to the air passing through the ducts 14. Other types of dryers may be employed in place of the one shown if all of the details of the preferred structure should not be desired.

The furnace 27, as shown in detail in Figs. 2 to 4, inclusive, consists of a metallic covering 30 which is preferably gas tight and provides mechanical protection for the hearth contained within the covering and also prevents air from coming into contact with the hearth. The hearth comprises a floor 31 made of a material which is substantially insoluble in the melt and entirely infusible at furnace temperatures. Such material may be graphite, amorphous carbon, and coke. The material is positioned well below the surface of the molten substance carried by said floor so that the molten substance makes an effective seal against infiltration of air which might cause combustion of the floor material. The particular carbonaceous material used is well graded to leave only a few voids and is well bonded with a high grade fireclay, carbonaceous binder or mixtures thereof. A layer of suitable insulating material 32 may be placed between the floor 31 and metallic covering 30 and be extended up the sides of the covering. The purpose of this insulating material is to prevent heat loss and to maintain throughout the hearth a temperature such that solidification of the melted material adjacent the hearth is minimized. The hearth is completed by a wall of firebrick 33 which extends entirely around the inside of the side walls of the covering 30. The hearth thus formed provides a reservoir for molten material. Orifice devices 40, of which one or several may be used, are placed at the front of the hearth at the proper level for the molten material to flow through the orifice devices and be exhausted in stream form. Blowing apparatus 41 is positioned adjacent each orifice device in position to properly shred the streams or stream of molten material into fibres. The orifice devices 40 may be of any conventional type and the blowing apparatus may consist of a conventional nozzle or may be of the type described in my Patent #1,977,406, October 16, 1934, or my Patent #2,126,411, August 9, 1938. The orifice devices 40 may consist of large notches or openings through which the molten material flows for delivery to a device for dividing the stream into a plurality of small streams.

The top or cover of the furnace consists of a number of water tubes 42 positioned over the hearth to form an arch. The tubes 42 are connected at their lower ends to headers 43, one of which extends along and rests upon the top of each side wall of the hearth. The tubes 42 are connected at their upper ends to a common drum 44. The headers 43 and drum 44 are connected at suitable intervals by water return pipes 45. The tubes 42, headers 43, drum 44 and tubes 45 form a steaming arch boiler which serves as a cover for the furnace.

The tubes 42 have projections 46 formed thereon along their inner sides, as more clearly shown in Fig. 4. These projections 46 serve as anchors for refractory material 47 placed over the tubes 42 and around the anchor members, 46 to form a cover surface for the furnace. The refractory material 47 is of a type which will tenaciously bond to metal and will become incandescent when heated. A layer of insulating material 48 is placed over the outer portions of the tubes 42 and forms an insulating covering for the tubes 42 and the refractory lining 47. The insulating material 48 may consist of mineral wool, diatomaceous earth compositions, or any other suitable material.

Plates 85 having perforations 86 are formed on or attached to tubes 42 at opposite side portions of the tubes. These plates do not meet at their outer end portions and the refractory material 47 covers and is bonded to the plates and is keyed into the perforations 86. Small spaces 87 are left between portions of the refractory lining 47 which cover adjacent tubes 42 to form expansion joints and allow for any unequal expansion which might take place between the tubes. The spaces 87 are very small and soon fill near the inner surface of the lining 47 with foreign materials sufficiently to seal them without interfering with their efficiency as expansion joints.

The spaces 87 may be formed by supporting thin sheets of combustible material in position between the tubes 42 and then forming the refractory lining 47 over the tubes and between the thin sheets. The sheets burn out when the furnace is fired and thus form the spaces.

In installations where the tubes 42 run parallel to each other throughout, the plates 85 and spaces 87 may be dispensed with if desired. A metallic plate 49 is placed over the insulating material 48 to provide mechanical protection for the enclosed arch structure.

Refractory material, insulation and studs 46 are omitted from the lower portions of the tubes 42 from the back of the furnace for a substantial distance along each side of the furnace as shown at 50. This provides a charging opening 51 for the raw material along a portion of each side of the furnace. The distance which this opening extends along each side of the furnace may be suitably varied to provide for different charging rates, different types of raw material, and different flame characteristics, as will be more clearly explained later.

The back of the steaming arch boiler consists of tubes 52, similar to the tubes 42, which extend from a lower header 53 to an upper header 54. The lower header 53 is connected in any suitable way with the headers 43, and the header 54 is likewise suitably connected with the drum 44, as by pipes 55. The exposed portions of the pipes 52 and 45, and likewise the headers if so desired, may be covered with insulating material 56.

The refractory material 47, insulating material 48, protective covering 49 and studs 46 are omitted from the water tubes 52 near their lower ends over an area extending completely across the rear of the furnace. This provides a charging opening 51' for the raw material at the rear of the furnace similar to charging openings 51 extending along the sides of the furnace.

The earlier mentioned hopper 26 is formed along the sides of the furnace around the openings 51 and across the back of the furnace along the opening 51'.

The steaming arch boiler is provided with a suitable relief valve 57 (Fig. 1) which may be of any conventional type, and is also provided with a steam outlet line 58, provided with a suitable cut-off valve 59, which leads to the blowing apparatus 41. A steam line 60 provided with a suitable cut-off valve 61 is connected to the steam line 58 and leads to any suitable source of steam which may be used to supplement the steam supply furnished by the steaming arch boiler, if such should ever be required during long runs, or if more steam is generated by the steaming arch boiler than can be used for the blowing apparatus, this surplus steam may be transferred to other points of use by the steam line 60. The steaming arch boiler is furnished with feed water by any conventional type feed water device, the details of which form no part of this invention.

The refractory material 47 and insulating material 48 are omitted from the water tubes 42 near the tops of the tubes over an area 62 to provide an outlet opening for the exhaust gases to the stack 28. Breeching 63 extends around the opening 62 and upwardly around the drum 44 and connects with the stack 28. The size of the opening 62 and the size of the breeching may be varied to suit different situations, as will be later described. The drum 44 is insulated above the water line and within the breeching with any suitable insulating material 64.

The front of the furnace consists of a wall formed of refractory material 47, insulating material 48, and a mechanical protective covering 49. Water cooled doors 65' are suitably placed in the front wall of the furnace, preferably, over the orifice devices 40 to facilitate cleaning, repair or replacement of these devices and to provide access to the interior of the furnace, generally. If desired, the front wall 49 can be provided with water tubes similar to water tubes 42 or 52 but the temperatures normally encountered at this particular point in the furnace are usually not sufficiently high to warrant the expense of these features. The temperatures at the front of the furnace are usually sufficiently low to permit the use of firebrick for the front wall and thereby eliminate the expense of the combined refractory and water-cooled wall, if such is desired.

Furnaces of the cupola type heretofore used for the production of rock wool have been uneconomical in operation and have possessed inherent defects which prevented their operation in a manner to consistently produce an excellent grade of rock wool. Reverberatory furnaces have been used, but they have proved to be exceptionally low in thermal efficiency and have been expensive to maintain because of their being exceptionally destructive to refractory materials with which it is necessary to cover or line their top portions. Of the two types of furnaces, cupolas have been primarily resorted to for blowing rock wool.

The raw materials usually available for making mineral wool consist of natural rocks, sand, slags from metallurgical industries, and fluxes for these materials. Unless a pure slag charge or a charge consisting entirely of igneous rock is used, there is considerable loss of weight during the melting, due to reactions between the various materials, and liberation of carbon dioxide and water of hydration. When materials which have not been previously fused are used as raw material in a cupola there is no way of controlling the oxidation of these materials, due to the fact that it is difficult to have an excess of air present during the short time which the materials are subjected to the heat. This results in a variable and uncontrollable melt color due to the change of iron colors from red to green and to black under different degrees of oxidation and reduction. Metallic iron is introduced into the mix due to smelting of iron from the fuel ash and raw materials. Due to the fact that the various reactions are endothermic, considerably more heat imput is required than is needed to impart the sensible heat to the material, and a relatively long period of time is required for the various reactions to be completed. Since the materials are exposed to high temperatures for a relatively short period of time, considerable heat is lost in the exhaust gases because of the lack of time for the materials to dissipate all of the heat necessary to change them from their raw, heterogeneous state, into a melted state. Moreover, the iron deposits mentioned above adhere to portions of the cupola and to the bottom in particular and decrease its insulating efficiency. This iron is in addition highly corrosive to refined orificing apparatus such as platinum or chrome tungsten alloys. Furthermore, the raw charge in a cupola exists so close to the orifice apparatus that unmelted particles of the charge and pieces of coke flow along with the molten material to the orifice and clog the same, making the use of a desirably small orifice extremely difficult.

By the use of the steaming arch furnace in accordance with this invention it is possible to use a reverberatory type furnace without the usual attendant maintenance expense and also avoid the undesirable results obtained by the use of a cupola. The water cooled refractory cover enables the interior lining of the cover to become incandescent during operation of the furnace and still not deteriorate, because the water tubes 42 and 52 absorb the heat which would otherwise escape to the atmosphere and in time demolish the cover completely. The heat so absorbed is generated into steam which is then used to fiberize the molten material.

Fuel is fed to the burner 21 in fluent form through a pipe 65. The fuel may be preheated if so desired. Within the burner the fuel is mixed with the hot air incoming through pipe 20. This results in the production of a superheated flame which has a temperature well above the maximum temperature obtainable by the use of a cold blast of air instead of the preheated air. The flame 75 (see Fig. 3) from the burner 21 is projected against the surface of the molten pool 66 and the bank of incoming material and can be adjusted in intensity, and/or by suitable adjustment of the position of the burner tip, as by making the burner and fuel pipe 65 bodily adjustable as shown in Fig. 3, to project the hottest portion of the flame over any portion of the surface of the molten material 66 or the bank of incoming unmelted material that may be desired. A very close control of the temperature of the molten material is thereby obtained since the flame may be concentrated on one portion or be distributed over the entire surface of the molten material pool 66 or the material bank, as the use of different materials may require.

The preheated raw material entering from the hopper 26 through the openings 51 and 51' form fettling areas or banks of material 80 distributed in a substantial U shape around the sides and back of the furnace remote from the burner 65. Radiation of heat from the luminous, radiant flame 75 heats the material in the banks 80 and that portion of the heat which is radiated to and absorbed by the refractory surface 47 causes the latter to become incandescent and, in turn, radiate heat to the banks 80. The water tubes 42 and 52 absorb substantially all of the heat in excess of that which the refractory surface could normally withstand and which would be destructive to the refractory and escape to the atmosphere, and convert this excess heat into steam energy which is used to fiberize the molten material in stream form. The preheated raw material in the banks 80 gradually fuses off into the molten pool 66, flows through this pool towards the front of the furnace, and is eventually withdrawn through the orificing apparatus.

The banks of material 80 formed along the sides of the furnace do not approach closer at any point to the orificing means 40 than the point 81, indicating the farthest forward point of the bank 80 which is shown by dotted lines in Fig. 3. For this reason all of the raw material charged into the furnace is caused to travel a distance through the molten material, before it is withdrawn, which is at least equal to the distance between point 81 and the orificing means. This insures that all of the material will be melted prior to reaching the orifice means, and clogging of the orifice is thereby prevented, and, with a given flow of material and a given flame intensity, the material can be subjected to a given temperature for a given length of time, since the area of the molten material pool 66 can be accurately controlled. The point 81 can be varied to suit the requirements of different materials by operating the spouts 23 and 24 so that material is charged forwardly to any desired point between the point 81 and the rear of the furnace. Under this condition of operation, that portion of the opening 51 which is not filled by incoming material may be covered by any suitable fireproof sheet or cover.

By the use of a reverberatory type of furnace and a preheated raw material charging system as above explained, the molten material is oxidized, clarified, agitated, and controlled as to temperature in a manner which produces a flame treating operation not heretofore possible with prior art devices, and a rock melt is formed which consists of silica and alumina reacted or mixed principally with iron oxide, lime, and magnesia, which melt is fluid at readily obtainable flame temperatures and useful for structural purposes when cooled to solid form.

Since the flame 75 is directed over the surface of the pool in a direction counter to the flow of molten material through the pool, the flame will mechanically sweep unmelted portions of the raw material which might be present away from the orificing means and maintain them in a high temperature area until they become molten. Since the material is required to travel a definite minimum distance through the molten pool and thereby be free from unmelted pieces and any existing particles of unmelted material floating on the surface are mechanically swept away from the orifice by the flame, very small orifices may be used, which enhance the quality of the wool produced. Orifices as small as $5/32''$ in diameter have been successfully used without clogging, and even smaller orifices may be used where the viscosity of the material is sufficiently low to require orifices of such small proportions. The more common orifice size of $1/16''$ will naturally function satisfactorily on a melt of this kind.

It is characteristic of the refractory incandescent surface 47 that a fused coating material is maintained on its inner surface at all times and that suspended ash and dust impinging upon this wall melt and run down, falling into the molten fuel along the edges or mingling with the incoming preheated raw material. The fusible ash and dust impinging on the bare surface of the tubes 42 at the exhaust opening 62 frequently form a crust or scale which does not bond tightly to the tubes and continues to increase in thickness to a point where its weight and unequal expansion and low mechanical strength cause it to crack and fall into the molten pool or bank 80. These pieces of crust or scale are immediately melted or maintained by the flame in the high temperature area until they are melted. This latter behavior is characteristic of the bare tubes only.

The exhaust gases pass out of the furnace through the opening 62 and breeching 63 to the stack 28 and into the dryer 1. They flow through the dryer and are subsequently exhausted through the stack 29. Since it is desirable for convenience in handling that the crushed material in the dryer drum 2 be not heated to the point of fusion, the temperature of the exhaust gases is dropped from that existing in the furnace, which may be in excess of 2800° F., to a temperature safely below the fusing point of the lowest melting ingredient of the raw material or combinations of raw material which may be passing through the dryer drum 2. The drum temperatures would normally vary from about 900° F., where the charge contains soda ash or salt cake, to around 2000° F., where the material contains an argillaceous limestone or blast furnace slag. This drop in temperature is obtained by passing the exhaust gases in contact with the exposed portions of the tubes 42 in the opening 62 and into contact with the water drum 44 below the water line thereof. The temperature drop may be varied to accommodate different materials by varying the size of the opening 62, during construction of the furnace, and by varying the width of the breeching 63 from front to back and/or by providing additional water cooled surface.

The hot exhaust gases in passing through the dryer drum 2 flow over and through the crushed raw materials as they are agitated within the drum by means of rotation of the drum and the inwardly directed projections 15, and the materials are thereby completely calcined and raised to such a temperature that when they are subjected to the higher temperature existing in the furnace they are in such a state that they become self-fluxing shortly after the beginning of a melting operation, and a rapid melting is obtained. For this reason the materials having a low melting temperature do not melt ahead of the materials having a high melting temperature and differential melting is dispensed with and a close control of the consistency of the finished product is thereby obtained.

By the use of this invention it is possible to produce a rock melt having certain definite characteristics in localities where raw material which is required to produce such a rock melt is not obtainable, or does not exist in suitable form for use, by crushing such raw materials as are available and blending with them such relatively small amounts of desired materials as are needed to form a raw material which will produce the desired characteristics in the melted rock.

The boiler and its several elements forming the cover for the steaming arch furnace need not be shaped in the manner specifically described as the preferred embodiment of the invention, but may take many different forms. The main considerations are that the boiler be shaped so as to maintain the incandescent furnace lining, convert surplus heat into steam energy, and serve as an arch for the furnace.

The foregoing description is intended to be illustrative and not limitative, since this invention may take other physical forms and is to be limited only by the scope of the appended claims.

Having now described my invention, what I claim is:

1. An apparatus for melting rock including calcining means, heating means providing a melting flame, a stationary reservoir in which material is melted by said heating means, means for transferring material from the calcining means to the reservoir while retaining the sensible heat of the material, means for discharging molten material from said reservoir in stream form, means for collecting exhaust gases from said heating means and conveying the same to said calcining means, and water-cooling means for reducing the temperature of said gases below the melting point of the material before said gases enter the calcining means.

2. An apparatus for melting rock comprising a furnace, means for charging crushed material into said furnace in bank form, means for directing a flame over the surface of said bank to melt the material, said means being relatively spaced from the bank of material, means for withdrawing molten material relatively near the flame directing means, and a cover for said furnace comprising a framework formed of tubes capable of carrying cooling water, and a covering supported by said tubes formed of material capable of assuming incandescence at the part thereof above said molten material.

3. A stationary furnace for the manufacture of mineral wool comprising a reservoir for a pool of molten material, means for supplying raw material to said pool at definite points thereof, orifice means for withdrawing said molten material from definite points in said pool so that all of the material travels a definite minimum distance through said pool, means located adjacent said orifice means for producing and directing the hottest portion of a blast flame over a definite area of said pool and in a direction counter to the normal flow of material through said pool to mechanically sweep unmelted substances away from the points of withdrawal, a cover for said reservoir, and water cooling means for said cover to prevent destruction of the same.

4. A process for melting material which comprises agitating raw material in crushed form, depositing said material after agitation in the form of a bank adjacent a heated area to permit the material to fuse away from said bank and form a pool in the heated area, withdrawing molten material in stream form from said pool at a definite minimum distance from the nearest portion of said bank, projecting a flame from a location adjacent the place of withdrawal of the molten material over the surface of said pool to maintain the pool molten and provide the heated area and in a direction to mechanically sweep unmelted material away from the withdrawal area, and directing the exhaust gases through the raw material while the same is being agitated to produce heat treatment thereof.

5. A process for making mineral wool which comprises agitating raw material in crushed form, depositing said material after agitation in the form of a bank adjacent a heated area to permit the material to fuse away from the bank and form a pool in the heated area, withdrawing molten material in stream form from said pool at a definite minimum distance from the nearest portion of said bank, projecting a flame over the surface of said pool to maintain the pool molten and provide the heated area and in a direction to mechanically sweep unmelted material away from the withdrawal area, passing water adjacent a confining surface made incandescent by said flame to cool the surface and prevent disintegration thereof and to generate steam, directing exhaust gases through the raw material while the same is being agitated to produce heat treatment thereof, and projecting a jet of the aforementioned steam against the molten material in stream form to shred the same into fibres.

6. A process for melting material comprising agitating raw material in crushed form, depositing said material after agitation in the form of a bank adjacent a heated area to permit the material to fuse away from the bank and form a pool in the heated area, withdrawing molten material from a definite portion of said pool, projecting a flame from a location adjacent the place of withdrawal of the molten material over the surface of said pool to maintain the pool molten and provide the heated area and in a direction to mechanically sweep unmelted material away from the withdrawal area, and directing exhaust gases through the raw material while the same is being agitated to produce heat treatment thereof.

EDWARD R. POWELL.